Sept. 26, 1972
KOJI IWAHASHI
3,694,307
PROCESS FOR REMOVING CHLORINE FROM PULP COOKING AGENTS
Filed Aug. 12, 1970
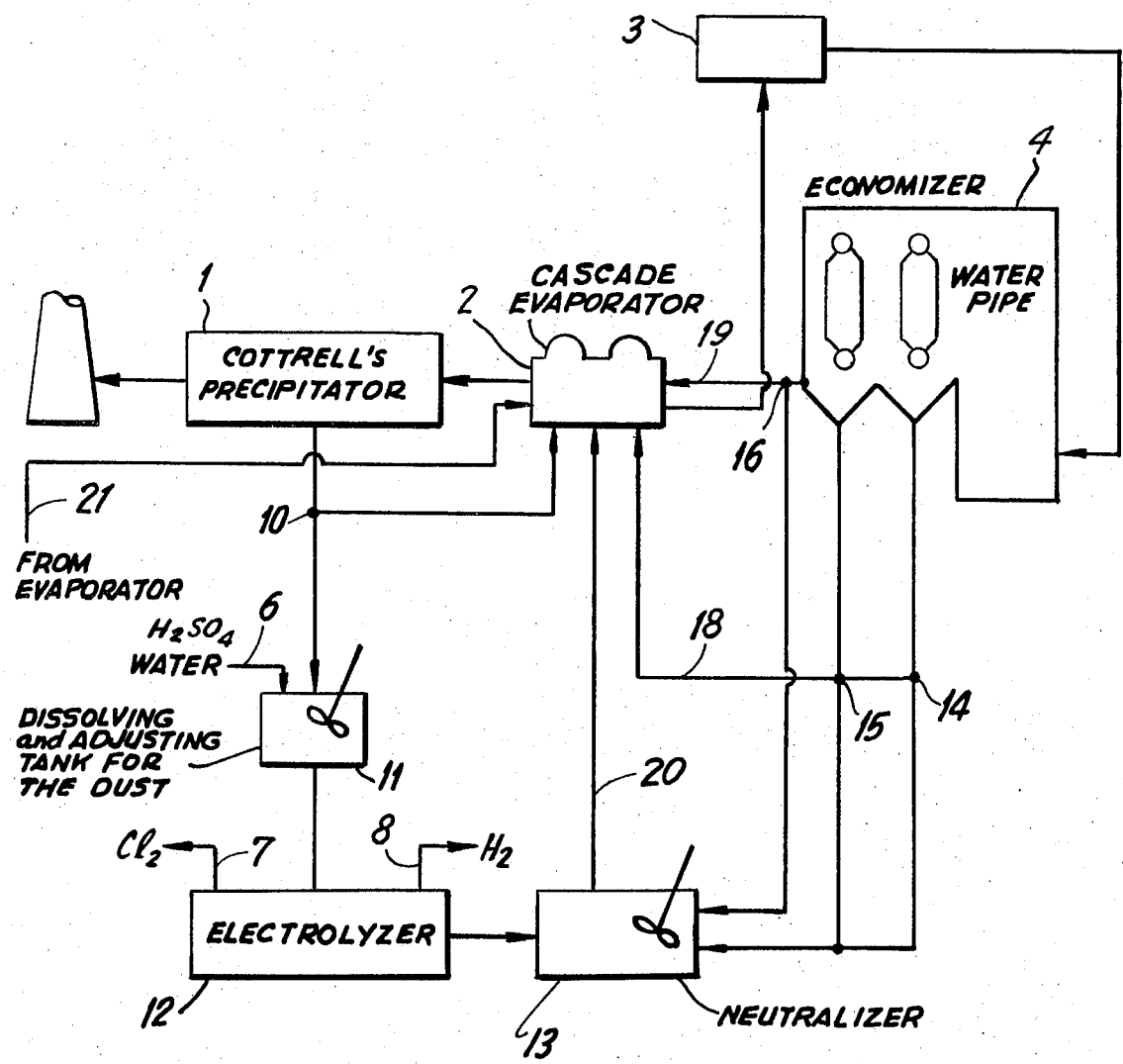
INVENTOR.
KOJI IWAHASHI
BY
*McGlew & Toren*
ATTORNEYS

United States Patent Office 3,694,307
Patented Sept. 26, 1972

3,694,307
PROCESS FOR REMOVING CHLORINE FROM PULP COOKING AGENTS
Koji Iwahashi, Nagayo-machi, Nishisonogi-gun, Japan, assignor to Mitsubishi Jukogyo Kabushiki Kaisha, Tokyo, Japan
Filed Aug. 12, 1970, Ser. No. 63,167
Claims priority, application Japan, Aug. 13, 1969, 44/64,005
Int. Cl. D21c 11/12
U.S. Cl. 162—30    10 Claims

ABSTRACT OF THE DISCLOSURE

Dechlorination of pulp cooking liquors in either continuous or batchwise manner from recovery boiler system in paper pulp manufacture is effected by acidification with sulfuric acid followed by electrolysis using an insoluble anode such as titanium plated with platinum, or lead dioxide, and with cast iron cathode.

The present invention provides a process for recovering pulp cooking agents by dechlorination effectively performed in a recovery boiler system. The process according to the invention eliminates various troubles due to NaCl contained in pulp cooking agents; such troubles include decrease in effective concentration of cooking agents, corrosion in the boiler system, and the like.

For this purpose, the invention namely, to eliminate such troubles employs a method in which dusts collected in a Cottrell's precipitator are dissolved in water, the solution being acidified thereafter by adding $H_2SO_4$ to the solution, an an electrolysis is performed maintaining the $H_2SO_4$ acidity of the solution to convert the Cl ion in NaCl to $Cl_2$ and remove the same from the solution. However, in this case, the amount of $H_2SO_4$ added into the solution must be kept to a minimum required value in order to maintain the balance of S contents in the agents. Namely, since the S contents are added in the form of replenished $Na_2SO_4$, the mol ratio of S to $Na_2O$ is one. However, when an excess of $H_2SO_4$ is added for the electrolysis process, $H_2SO_4$ will remain in the processing liquid so that the S/$Na_2O$ ratio will be increased with the result that an excessive amount of S is supplied to the cooking agents gradually increasing the S concentration therein. If, for his reason, the electrolysis processing is not performed completely but processed only 50 to 70% and the remaining NaCl is returned to black solution, $H_2SO_4$ will remain and, as previously described, the S concentration in the agents is gradually increased during the process of circulation of the agents to destroy the balance of S contents therein.

In view of the above, it may be possible to limit the amount of $H_2SO_4$ added during the electrolysis process to a required minimum value. However, this is also disadvantageous in that, because the remaining amount of $H_2SO_4$ decreases around the end of the electrolysis process, the efficiency of dissolving $Cl_2$ will be decreased.

An object of the present invention is to eliminate various troubles due to NaCl contained in pulp cooking agents, such as reduction of the effective concentration of cooking agents, corrosion in the boiler system, etc., and provide a process for recovering cooking agents by which dechlorination can be effectively performed.

Thus, a process for recovering pulp cooking agents in accordance with the present invention is characterized by (a), dissolving in water a portion of dusts collected in a Cottrell's precipitator provided in the flue of a recovery boiler in a pulp cooking agent recovery system (b), adding sulphuric acid to the resultant solution to acidify it (c), electrolysing the aforesaid solution while maintaining its sulphuric acidity and using an insoluble anode to remove chlorine ion in the form of chlorine gas in the resultant electrolyte solution (d), thereafter adding to the said solution dusts collected in a conduit connecting one or more of (i) an underkettle hopper outlet, (ii) an economizer hopper outlet and (iii) an economizer outlet with a cascade evaporator to neutralize the free sulphuric acid, and (e) then returning the so obtained neutralized liquid to the inlet of the aforesaid cascade evaporator provided on the aforesaid recovery boiler.

This process can be shown by the following reaction formula.

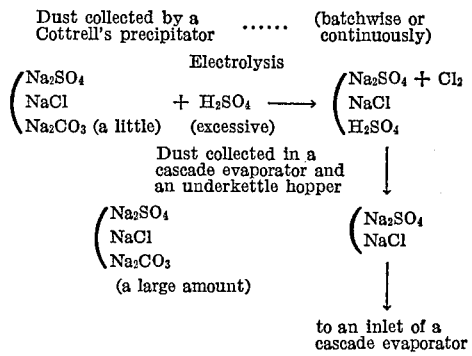

An embodiment of the process according to the present invention will now be described taking reference to the drawing.

BRIEF DESCRIPTION OF THE DRAWING

The drawing shows a flow diagram of an apparatus for recovering pulp cooking agents illustrating an embodiment of the present invention.

In the recovery boiler system shown in the drawing, 1 designates a Cottrell's precipitator, installed in a stack or flue (partially shown), 2 a cascade evaporator, 3 a Glauber's salt sodium sulfate mixing tank, 4 a body of the recovery boiler 4, 10 an outlet provided in a conduit connecting said Cottrell's precipitator 1 and the cascade evaporator 2 for taking out dusts collected in the Cottrell's precipitator, 11 a dissolving and adjusting tank for the dust taken out from said dust outlet 10, and 12 an electrolyzer for the dust solution adjusted in the dissolving and adjusting tank 11, and the electrolyzer is provided with an insoluble anode 7 made of platinum and the like (titanium plated with platinum, or lead dioxide) and with iron cathode 8. 13 is a neutralizer for neutralizing the solution which is obtained by electrolyzing in the electrolyzer 12 the dust collected in a pipe line connecting one or more of the outlet of underkettle hopper 14, the outlet of an economizer hopper 15 and the outlet of an economizer 16 with a cascade evaporator 2 into the electrolyzer 12, and the neutralized solution from the said neutralizer 13 is returned to the cascade evaporator 4 by means of line 17.

With further reference to the drawing illustrating the recovery boiler system as described herein 5, 14, is an outlet for the dust from the underkettle hopper and provided in a pipe line 18 connecting the outlet of the underkettle hopper 14 and the cascade evaporator 4 in the boiler system 5, 15 an outlet for the dust from the economizer hopper in said system and provided in the pipe line 18 connecting the outlet of the economizer hopper 15 and the cascade evaporator 4, and 16 an outlet for the dust from the circumference of the cascade evaporator and provided in a pipe line connecting the outlet of the economizer and the cascade evaporator 2. The dusts taken out of one or more of the outlets 14, 15 and 16 are introduced into the neutralizer 13 and the effluent therefrom is passed by pipe line 20 to the cascade evaporator 2. Line 21 illustrates a pipeline for introducing a charge to the cascade evaporator 2 from an evaporator (not shown).

The process of the invention may be carried out in two ways, as will be understood in the following discussion with reference to the drawing.

According to one of the ways, $H_2SO_4$ is added through line 6 with an amount exceeding the equivalent amount of NaCl in the dust, and the solution is electrolyzed in the electrolyzer 12 with the presence of an excessive $H_2SO_4$ even at the end of electrolysis (with this process, the $Cl_2$ separation efficiency is increased), the treated dust solution being supplied batchwise, and the electrolyzed solution being introduced into the neutralizer batchwise.

According to the alternative way, $H_2SO_4$ is added with the amount equal to or exceeding the equivalent amount of NaCl in the dust and electrolysis is then carried out in the electrolyzer 12, a fresh solution of the treated dust being continuously supplied thereto, while the electrolyzed solution comprising residual NaCl being continuously withdrawn through line 17 and transferred to the neutralizer 13.

In the above two processes according to the invention the electrolyzed solution introduced into the neutralizer 13 is neutralized with the presence of the added alkaline dust mainly consisting of $Na_2CO_3$ and collected in the pipe line 18 connecting one or more of the outlet of the underkettle hopper 14, the outlet of the economizer hopper 15 and the pipeline 19 connecting the outlet 16 of the economizer of the recovery boiler system 5 with the cascade evaporator 2, the neutralized solution being returned by pipe line 20 to the inlet of the cascade evaporator 2.

According to this arrangement, the dust collected in the Cottrell's precipitator 2 in which NaCl is the most concentrated among the chemical circulating system is taken out from the outlet 5, charged into the dust dissolving and adjusting tank 11 to be dissolved therein with water and made to be acidic with $H_2SO_4$, and introduced into the electrolyzer 12 to be electrolyzed with the insoluble anode 7 so as to remove $Cl_2$, the hydrogen being removed at the cathode 8.

The reasons why $H_2SO_4$ is hereby used will now be described. If the dust collected by a Cottrell's precipitator is electrolyzed as it is dissolved in water, that is, under an alkaline or neutral condition, the reaction represented by the following Formula A occurs, and $Cl_2$ is absorbed into the liquid so that $Cl_2$ itself will not be separated.

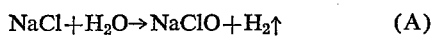

$$NaCl + H_2O \rightarrow NaClO + H_2\uparrow \qquad (A)$$

This is due to the fact that generated $Cl_2$ is absorbed into the liquid as seen in the Formula B.

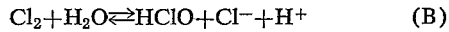

$$Cl_2 + H_2O \rightleftharpoons HClO + Cl^- + H^+ \qquad (B)$$

If $H_2SO_4$ is added to the above system, $H^+$ ions will be formed, and the equilibrium of the Formula B is affected and reaction proceeds from the right column to the left column, so that $Cl_2$ is separated.

The dust solution electrolyzed in the electrolyzer 12 is transferred to the neutralizer 13, wherein the excessive $H_2SO_4$ is neutralized by adding a part of the dust collected at one or more of the outlets 14 for the dust collected from the underkettle hopper, the outlet 15 for the dust collected from the economizer hopper, and the outlet 16 for the dust collected from the economizer. These dusts mainly consist of $Na_2CO_3$: for instance, the dust composition consists of 10–20% $Na_2SO_4$ and 50–70% $Na_2CO_3$, and the neutralized dust solution is returned to the inlet of the cascade evaporator 2. The composition of the neutralized solution thus obtained has a $S/Na_2O$ ratio substantially similar to that of the dust at the outlet 10 of the Cottrell's precipitator 1.

As described above, the present invention provides the following advantages.

(a) By taking out the dusts of the highest NaCl and $Na_2SO_4$ contents, that is, those collected in the Cottrell's precipitator and electrolyzing them, $Cl_2$ can be removed without accompanying any troubles such as decrease in the effective concentration of the pulp digesting agents, corrosion in the boiler system, and so on.

(b) Since the dusts around the underkettle hopper and the cascade evaporator including $Na_2CO_3$ as the major component is used for neutralizing the electrolyte, an excess of $H_2SO_4$ can be added during electrolysis so that $Cl_2$ can substantially completely be removed when the process is carried out batchwise. Further, since the excess of $H_2SO_4$ is neutralized by the dusts and does not remain, the S concentration in the agents does not increase and the S balance can be maintained.

Further, the electrolysis process can also be carried out continuously. Because, even if efficiency of chlorine removal is decreased (or remaining $H_2SO_4$ is increased), no inconveniences will be encountered in a neutralizing process.

I claim:

1. Process for recovering pulp cooking agents in a recovery boiler system which is provided with a cascade evaporator therein, which comprises the steps:
   (a) dissolving with water a first portion of dust collected by a Cottrell's precipitator installed in the flue of said recovery boiler system,
   (b) adding sulfuric acid in sufficient amount to make the resultant solution acidic,
   (c) thereafter subjecting the so acidified solution to electrolysis with an insoluble anode to remove chlorine ions in the electrolyte as chlorine gas while maintaining said electrolyte solution in an acidic condition with sulfuric acid,
   (d) neutralizing the resulting solution so subjected to electrolysis by adding thereto a second portion of dust collected from said chemical recovery boiler system, and
   (e) thereafter returning the so neutralize resultant solution to the cascade evaporator which is provided in said recovery boiler system, and from which effluent is withdrawn and charged to said boiler recovery system.

2. The process of claim 1, further characterized in that said process is carried out batchwise, and said anode is insoluble in aqueous acid solution.

3. The process of claim 1, further characterized in that said process is carried out continuously, and said anode is insoluble in aqueous acid solution.

4. The process of claim 1, further characterized in that the dust, collected from the chemical boiler system and added to the neutralization vessel after electrolysis, comprises at least one of the following: (i) dust from the outlet of the underkettle hopper, (ii) dust from the outlet of the economizer to the cascade evaporator.

5. The process of claim 2, further characterized in that the dust collected from the chemical recovery boiler system and added to the neutralization vessel after electrolysis, comprises at least one of the following: (i) dust from the outlet of the underkettle hopper, (ii) dust from the outlet of the economizer hopper, and (iii) dust from the outlet of the economizer to the cascade evaporator.

6. The process of claim 3, further characterized in that the dust collected from the chemical recovery boiler system and added to the neutralization vessel after electrolysis, comprises at least one of the following: (i) dust from the outlet of the underkettle hopper, (ii) dust from the outlet of the economizer hopper, and (iii) dust from the outlet of the economizer to the cascade evaporator.

7. The process of claim 2, further characterized in that said anode comprises a member selected from the group consisting of titanium plated with platinum, and lead dioxide.

8. The process of claim 3, further characterized in that said anode comprises a member selected from the group consisting of titanium, titanium plated with platinum, and lead dioxide.

9. The process of claim 5, further characterized in that said anode comprises a member selected from the group consisting of titanium, titanium plated with platinum, and lead dioxide.

10. The process of claim 6, further characterized in that said anode comprises a member selected from the group consisting of titanium, titanium plated with platinum, and lead dioxide.

References Cited

UNITED STATES PATENTS

| | | | |
|---|---|---|---|
| 3,561,922 | 2/1971 | Allen et al. | 162—30 X |
| 3,560,329 | 2/1971 | Nelson et al. | 162—30 |
| 3,347,739 | 10/1967 | Tomlinson | 162—30 |
| 1,847,435 | 3/1932 | Low | 23—219 |

FOREIGN PATENTS

| | | | |
|---|---|---|---|
| 15,282 | 8/1900 | Great Britain | 23—219 |
| 13,815 | 8/1900 | Great Britain | 23—219 |

OTHER REFERENCES

"New Route to Chlorine Recovery," Chemical Engineering, vol. 6, No. 17 (Aug. 24, 1959), p. 60.

S. LEON BASHORE, Primary Examiner

A. D'ANDREA, JR., Assistant Examiner

U.C. Cl. X.R.

23—219; 204—128